United States Patent [19]

Beran et al.

[11] Patent Number: 5,021,644

[45] Date of Patent: Jun. 4, 1991

[54] PRESENCE DETECTING APPARATUS AND METHOD FOR AUTOMATIC DOORS

[75] Inventors: Mark A. Beran, Niwot; Farrokh Fattahi, Boulder, both of Colo.

[73] Assignee: BC Research and Development, Inc., Niwot, Colo.

[21] Appl. No.: 462,131

[22] Filed: Jan. 8, 1990

[51] Int. Cl.$^5$ ............................................. G01V 9/04
[52] U.S. Cl. .................................... 250/221; 340/555
[58] Field of Search ................. 250/221, 222.1, 338.1, 250/342, 341; 340/555, 556, 565, 567

[56] References Cited

U.S. PATENT DOCUMENTS

| | | | |
|---|---|---|---|
| 4,119,843 | 10/1978 | Hinds | 250/222.1 |
| 4,179,691 | 12/1979 | Keller | 340/565 |
| 4,565,029 | 1/1986 | Kornbrekke et al. | 250/221 |
| 4,570,157 | 2/1986 | Kodaira | 340/567 |
| 4,669,218 | 6/1987 | Kornbrekke et al. | 250/221 |
| 4,697,383 | 10/1987 | Hagiwara . | |
| 4,698,937 | 10/1987 | Kornbrekke et al. | 250/221 |
| 4,733,081 | 3/1988 | Mizukami | 250/341 |
| 4,809,000 | 2/1989 | Carroll . | |
| 4,823,010 | 4/1989 | Kornbrekke et al. | 250/221 |
| 4,929,833 | 5/1990 | Smith | 250/221 |

Primary Examiner—David C. Nelms
Attorney, Agent, or Firm—Harold A. Burdick

[57] ABSTRACT

A presence detecting apparatus and method are disclosed, the apparatus including an emitter array and receiver array configured, oriented and shielded to provide an effective detection area characterized by a truncated elliptical footprint, a background compensation network for automatically compensating for variations in environmental conditions in the detection area to provide a substantially constant detection sensitivity, and discriminating circuitry for discriminating signals indicative of a body in the detection area from transient and steady state signals. The emitter circuits and receiving and detecting circuits are capable of asynchronous operation, and the receiver array and detector array are housed so that the receiver array is substantially isolated from selected electromagnetic signals from the detector array.

30 Claims, 5 Drawing Sheets

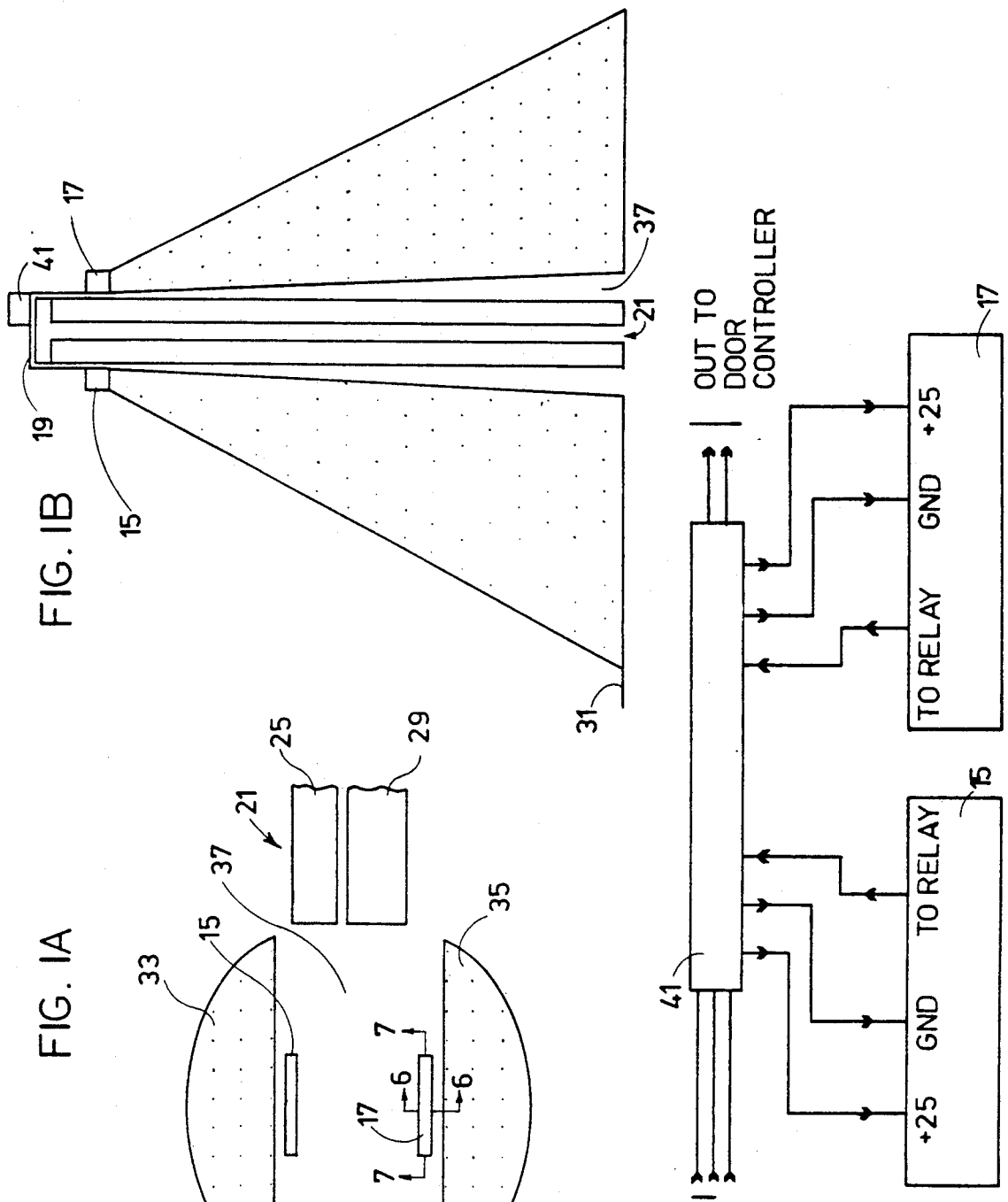

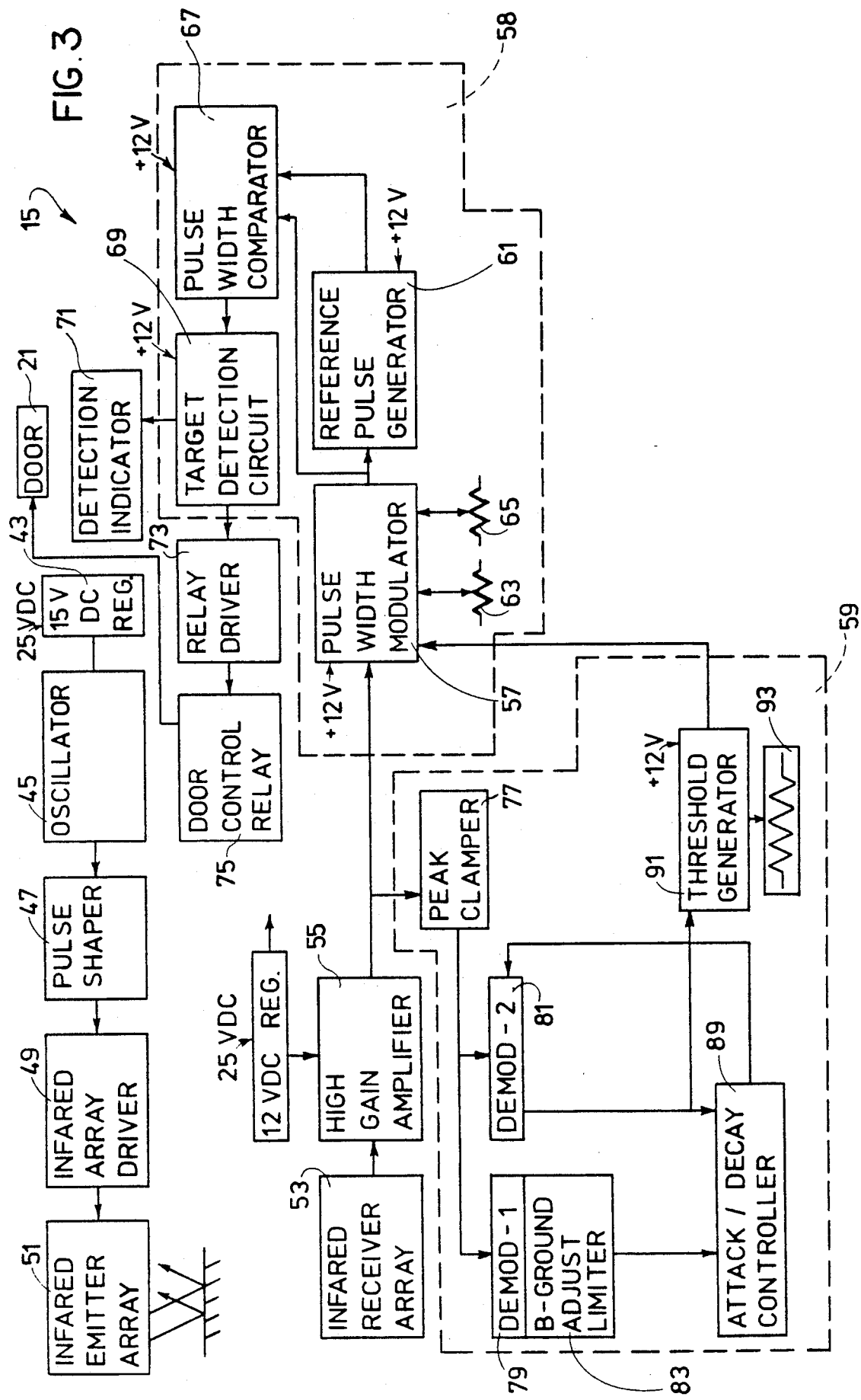

PRESENCE DETECTING APPARATUS AND METHOD FOR AUTOMATIC DOORS

FIELD OF THE INVENTION

This invention relates to presence detecting apparatus and methods, and, more particularly, relates to presence detecting apparatus and methods for automatic doors.

BACKGROUND OF THE INVENTION

Presence detecting device for automatic doors have been heretofore known and/or utilized wherein a plurality of infrared emitters and receivers are utilized to provide a detection area at the threshold of the automatically actuated door (see for example U.S. Pat. Nos. 4,823,010, 4,733,081, 4,697,383, 4,669,218, 4,565,029, and 4,698,937). In general, such devices have utilized single clock synchronization of infrared emitters to project a beam of energy in a detection area and receivers together with detector circuitry to receive reflected energy and send an operational signal when a target is detected at the threshold of a door. Such devices have, in some cases, employed a variety of means to prevent the door itself from being operationally treated as a target.

Various arrangements to compensate for variations in environmental factors in the detection area to minimize the number of malfunctions of the automatic door are also known and/or have been utilized. Such arrangements include manual threshold sensitivity adjustments (see for example U.S. Pat. No. 4,823,010) and/or utilization of elaborate and expensive multiple integration circuits (see for example U.S. Pat. No. 4,733,081, wherein the rate of change, or variation, of signal is utilized to discriminate a human body from the background signal received by a detector).

In addition, such devices and methods as have been heretofore known have been subject to false triggers, resulting in opening of a door where no body, such as a human body, shopping cart or the like, is present, or when transient and short lived occurrences are detected such as the reflection of sunlight from moving reflective surfaces or the reflection of the emitted infrared energy from a falling leaf or snowflake in the detection area.

It would thus be desirable to provide a simple and inexpensive presence detecting apparatus and method which includes automatic adjustment of the sensitivity of such an apparatus to compensate for changes in the environment in a detection area (such as snowfall, rain, daylight and darkness) while providing means for ignoring random and short lived transient occurrences. Such an apparatus would preferably be capable of asynchronous operation of the emitter and receiver/detector stages and resolve the problem of detecting movement of the door itself in the detection area simply and inexpensively. Further improvement in such heretofore known devices and methods could thus still be utilized.

SUMMARY OF THE INVENTION

This invention provides a presence detecting apparatus and method, the apparatus including an emitter for emitting signals to a detection area, a receiver for receiving at least some of the signals reflected from surfaces present in the detection area, a background compensation network connected with the receiver for automatically adjusting detection sensitivity of the apparatus to compensate for variations in background conditions in the detection area, and discriminating circuitry connected with the receiver and the background compensation network for discriminating when reflected signals received by the receiver are indicative of a body (such as a human body or other object moving into the detection area) and for providing a detection output responsive thereto.

The receiver and discriminating circuitry includes means for providing synchronization thereof independently from the emitter so that the emitter and the discriminating circuitry are capable of asynchronous operation.

The emitter and receiver are configured, oriented and shielded to provide an effective detection area characterized by a truncated elliptical footprint at the threshold of a doorway. The emitter and receiver are housed in separate compartments of a housing, the compartments being separated by an improved isolating device for sealing the chambers against leakage of electromagnetic radiation between the chambers within the housing or laterally through the lens, or filter, through which the selected electromagnetic radiation is emitted to the detection area.

The background compensation network includes first and second signal demodulators having a different demodulation time constants to thereby provide for a first response rate when the network increases the detection sensitivity threshold of the apparatus and a second response rate when the network decreases the detection sensitivity threshold. The discriminating circuitry includes circuits for detecting transient signals, such as reflected light from vehicles and the like, and substantially limiting the overall responsiveness of the discriminating circuit responses to true targets (bodies of matter moving into the detection area). Transient signal detection is accomplished in two stages, a comparator stage and a pulse accumulation stage, for comparing target detection signals with a transient signal discriminating pulse and for providing an actuating output from the apparatus only after a selected number of pulses indicative of a body in the detection area are accumulated within a selected time period.

It is therefore an object of this invention to provide an improved presence detecting apparatus and method.

It is another object of this invention to provide a presence detecting apparatus and method wherein an emitter stage and a receiver/detector stage are asynchronously operable.

It is another object of this invention to provide a presence detecting apparatus and method having an automatically variable detection sensitivity threshold.

It is still another object of this invention to provide a presence detecting apparatus and method wherein a background compensation network provides a detection sensitivity threshold which is automatically variable at a first response rate for increasing the detection sensitivity threshold and automatically variable at a second response rate when decreasing the detection sensitivity threshold of the apparatus.

It is another object of this invention to provide a presence detecting apparatus having a background compensation network including a first signal demodulator having a relatively short demodulation time constant and a second signal demodulator operably connected with the first signal demodulator and having a longer demodulation time constant than the time constant of the first signal demodulator to provide, within limitations established by the output from the first signal demodulator, an output indicative of modulated signals received at a receiver in the presence detector.

It is yet another object of this invention to provide a presence detecting apparatus and method wherein transient signals received are detected and response thereto substantially eliminated.

It is still another object of this invention to provide a housing apparatus for a presence detector including a mounting structure which in part defines a chamber for mounting the presence detector therein, a filter, or lens, mountable at one part of the mounting structure and having first and second portions, a chamber divider for dividing the chamber into first and second compartments and substantially electromagnetically sealing the first compartment from the second compartment of the chamber, and a bridge mountable at one part of the mounting structure and which is made of material substantially opaque to selected electromagnetic radiation, the bridge engaging the first and second portions of the filter and a part of the chamber divider.

It is another object of this invention to provide a presence detecting apparatus and method for use with automatic doors wherein emitters and/or receivers are configured, oriented and shielded to provide a physical detection area characterized by a truncated elliptical effective detection area, or footprint, at the threshold of the doorway.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIGS. 1A and 1B are diagrammatic illustrations depicting positioning of the apparatus of this invention adjacent to a sliding door and illustrating the detection area provided thereby at the doorway;

FIG. 2 is a block diagram illustrating the apparatus of this invention;

FIG. 3 is a more detailed block diagram illustrating the apparatus of this invention;

DESCRIPTION OF THE INVENTION

Figure 4:
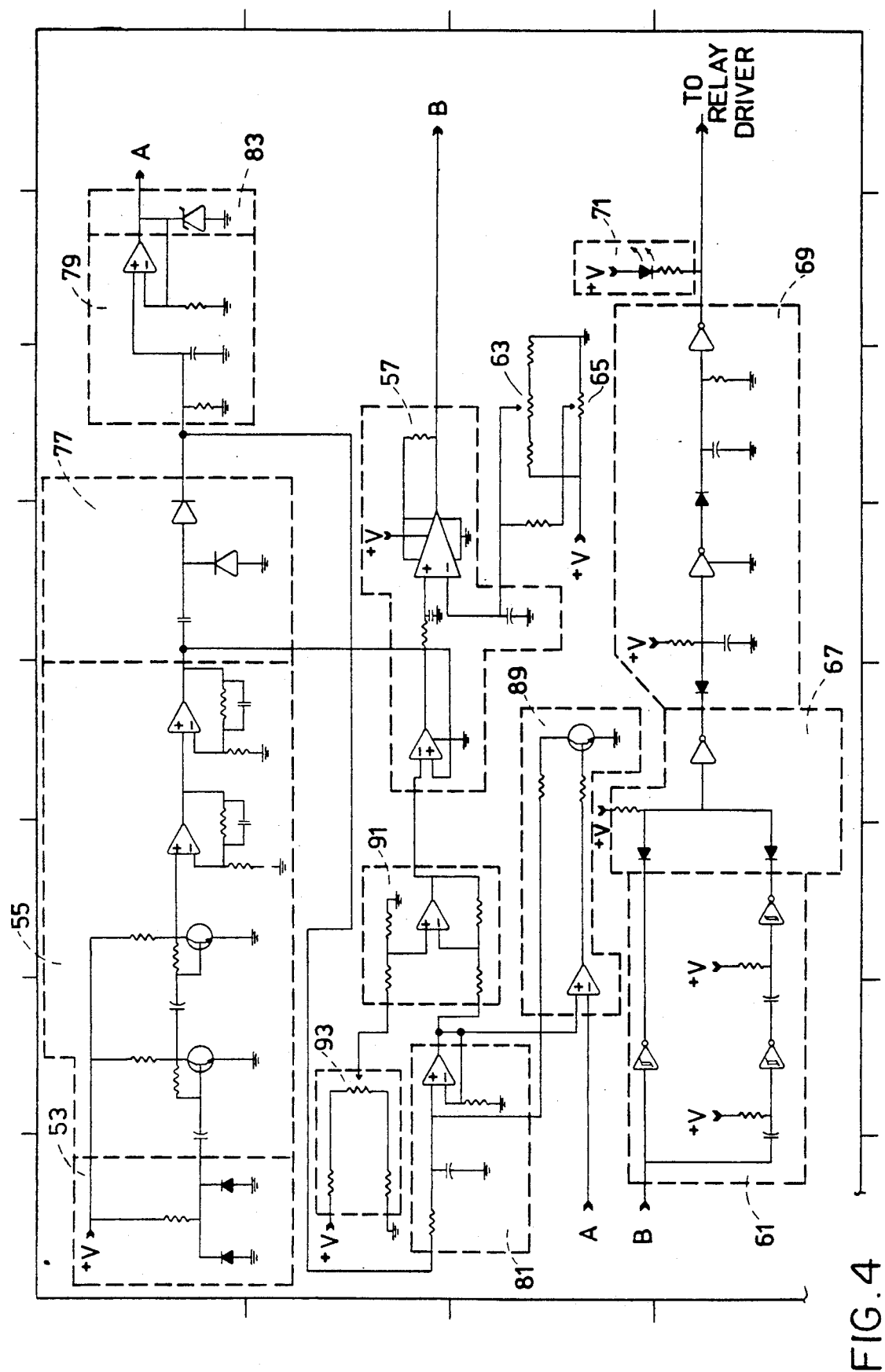
FIG. 4 is a schematic illustration of the receiver, background compensation network, and discriminating circuitry of the apparatus of this invention.

Apparatus 15 and 17 of this invention are illustrated in FIGS. 1A and 1B mounted to sliding door transom member 19 adjacent to sliding door assembly 21 including stationary door members 23 and 25 and sliding door members 27 and 29. Such apparatus are typically mounted at a standard height (for example 84 inches above floor 31).

As will be further developed herein, the emitter array and receiver array of apparatus 15 and 17 each cooperate to effectively define a detection area characterized by a truncated elliptical effective detection zone, or footprint, 33 and 35 at each side of threshold 37 of the doorway, each active footprint measuring, for example, roughly 15 to 30 inches (from the center of the flat, or truncated, edge of the ellipse to the furthermost portion of the ellipse away from the door) by about 72 to 96 inches (along the truncated edge and coinciding with the approximate size of the largest door opening). By providing an active detection area of this general configuration at each side of the doorway threshold, the problem of false triggers due to movement of the doorway through the active detection area is substantially eliminated.

As illustrated in FIG. 2, apparatus 15 and 17 are connected with power supply and driver unit 41 (which may be mounted anywhere adjacent to the door, for example adjacent to transom unit 19) for providing a 25 volt DC power signal to each of the units and for receiving the actuating output signal from the units to relay circuits therein to thus actuate the door opening and closing controller.

FIGS. 3 and 4 illustrate the apparatus of this invention in more detail (it being understood that apparatus 15 and 17 are substantially identically configured). The 25 volt DC power supply received from supply and driver unit 41 is regulated at regulator 43 for thus providing a 15 volt DC signal to solid state oscillator 45, oscillator 45 providing the primary time base used for modulation of the emitted infrared signals. The output from oscillator 45 is received at pulse shaper stage 47 for controlling the duty cycle of the signal received at infrared array driver unit 49. Driver 49 activates the emitter array substantially synchronously and continuously (the four emitter LEDs, illustrated in FIGS. 8A and 8B, being driven in series) for a predetermined period, or duty cycle, at a repetition rate controlled by the modulation frequency of solid state oscillator 45 (for example a signal having a modulation frequency from about 1 to 5 kHz with approximately a 10% duty cycle).

Emitter array 51 consists of a multiplicity of infrared emitter diodes with different angles of radiation and mounted and oriented in a specific pattern, as more fully set forth hereinafter, to maximize uniform radiation intensity within the desired detection area. Selected electromagnetic radiation from emitter array 51 is reflected from surfaces in the detection area, at least some of the scattered electromagnetic signals being received by infrared receiver array 53. Receiver array 53 includes a plurality of infrared energy detectors mounted at specific detection angles to receive the scattered infrared energy reflected from surfaces, including objects and/or bodies moving into the detection area as well as structural surfaces (for example floor 31). The mounting angles and the location of the receiver array are optimized to match the emission pattern of the emitter array and provide for optimum detection of persons and objects within the designated detection area.

The modulated, scattered infrared energy received by receiver array 53 is amplified by high gain amplifier stage 55 to provide a useful level of modulated signal, the amplitude variations therein being dependent on the amount of reflected infrared energy received at receiver array 53. High gain amplifier stage 55 also provides a certain degree of filtration against unmodulated optical interference detected by receiver array 53. In the absence of any body, such as a person or object, which is moved within the detection area, the amount of reflected infrared radiation received is dependent only on the ambient conditions in the detection area and is constant with the exception of small variations caused by changes in environmental factors (such as temperature conditions, time of day or night, and the condition of floor 31, for example whether wet, dry, snow covered or the like). When a person or object of sufficient cross section enters the detection area, the amount of scattered radiation received at the receiver is increased, causing a corresponding increase in the output of high gain amplifier stage 55.

The modulated output of amplifier stage 55 provides the required clock input for pulse width modulator circuit 57 and furnishes the necessary input to background compensation network 59 described in more detail hereinafter. The output from background compensation network 59 is a variable detection threshold signal which provides the modulation input to pulse width modulator circuitry 57 of discriminating circuitry 58. Utilizing the detection threshold sensitivity information provided by the output signal from background compensation network 59, pulse width modulator 57 generates a pulse train, the width of each pulse being proportional to the amount of scattered infrared energy received by receiver array 53. The pulses generated by pulse width modulator circuitry 57 also provide the synchronization signal for reference pulse generator 61, thereby providing synchronization of the overall discrimination circuitry 58 independently from synchronization of the infrared emitter stage provided by oscillator 45 so that asynchronous operation thereof is achievable.

Each pulse from pulse width modulator circuitry 57 initiates generation of two consecutive pulses from reference pulse generator 61, the first pulse, having a width adjustable by coarse and fine adjustment potentiometers 63 and 65 (for example in a range between 1 and 10 microseconds), providing the first stage of a two stage transient signal detector, and the second pulse providing a target detection window.

Figure 5:
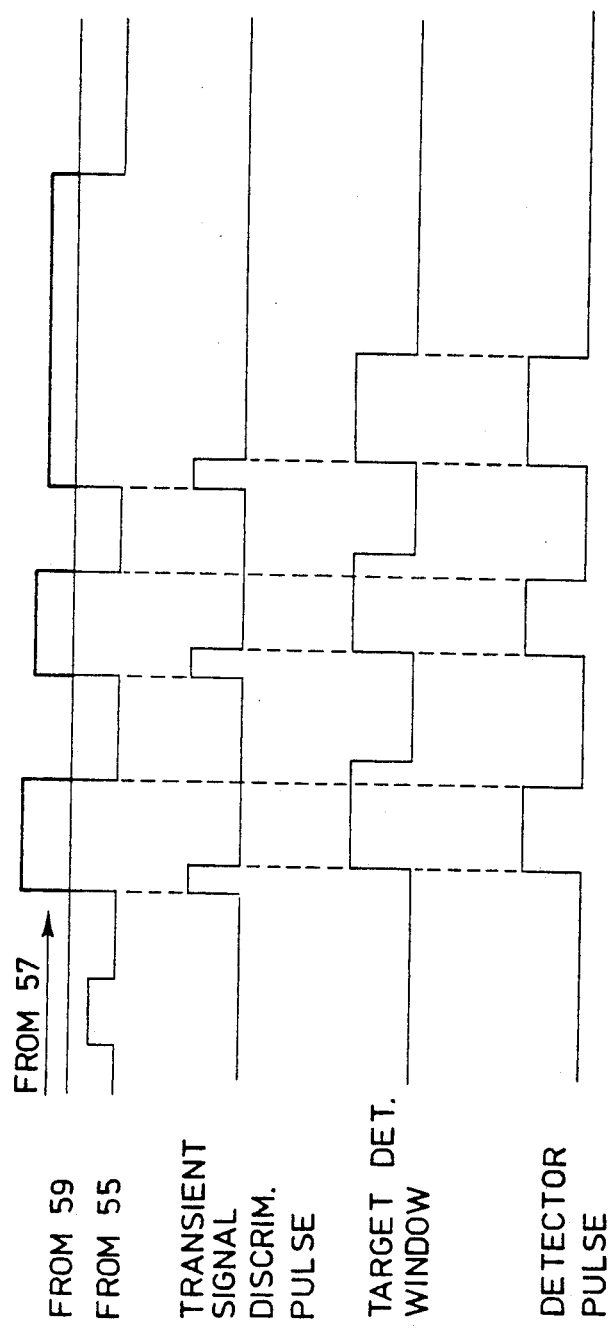
FIG. 5 is an illustration of the transient signal discrimination pulse and target detection window pulse generated by the apparatus and to which a pulse width modulated signal containing target detection information is compared.

As logically illustrated in FIG. 5, the pulse width modulated signal containing target detection information from pulse width modulator 57 is compared with the two pulses generated by reference pulse generator 61 at pulse width comparator stage 67. If the output pulse of pulse width modulator circuitry 57 containing the target information is sufficiently long to exceed the transient signal discrimination pulse (for example having a pulse duration of 10 microseconds) and continues through the target detection window pulse (for example having a pulse duration of 20 microseconds and occurring after the transient signal pulse), a pulse proportional to the overlap duration of the output pulse and the target detection window pulse is generated and passed to target detection circuit 69.

Target detection circuit 69 contains the second stage of the transient signal detector and provides an actuating output only when a sufficient number of detection output pulses within a predetermined time period (for example at least 10 pulses in 5 milliseconds) is received from pulse width comparator 67. Upon receipt of the selected number of pulses, a true target (the presence of a body in the detection area) is indicated at LED 71 and an actuating output signal activates relay driver circuit 73 which in turn activates door control relay 75 (a normally open or normally closed dry contact) for activation of appropriate opening and closing circuits of automatic door 21.

Returning now to background compensation network 59, the output signal from high gain amplifier 55 is first referenced to ground at peak clamper 77 and provided at first and second demodulators 79 and 81. Demodulator circuit 79 has a short demodulation time constant (for example 20 to 50 milliseconds), while demodulator 81 has a longer demodulation time constant (for example 1 to 5 minutes), both demodulators being provided for demodulation of the reflected, modulated signal as represented at the output of peak clamper 77. The outputs of the demodulators are DC signals proportional to the level of received modulated signal.

Demodulator 79 provides the minimum and maximum boundaries for the variations in the output level of demodulator circuit 81. Demodulator 79 has limiter circuitry 83 associated therewith to limit the variations in the output DC level to those normally caused by changes in environmental factors (i.e., not including bodies moving within the detection area). The output signals from demodulators 79 and 81 are provided to attack/decay controller 89, the output from which is provided to demodulator 81 to provide a fast discharge path and hence asymmetric response of background compensation.

The DC output variations of demodulator 81, subject to the limiting and boundary constraints imposed by demodulator 79, are algebraically summed at threshold generator 91 with a preset threshold level (normally set for maximum sensitivity under normal environmental conditions) adjusted by potentiometer 93. For example, when the sun moves behind a cloud the input signal to demodulators 79 and 81 decreases, rapidly responsive to which the output signal from reference generator 91 will be automatically increased to maintain the desired sensitivity threshold level in the detection area. When the sun emerges from behind the cloud and the input to the demodulators increases, the output signal from the reference generator decreases, however much more slowly, to again achieve the desired sensitivity threshold. The result is a DC output from threshold generator 91 which provides a variable detection threshold sensitivity that will maintain substantially constant sensitivity of the apparatus by automatically adjusting for variations in background information received at receiver array 53 due to environmental factors experienced in the detection area.

By providing demodulator circuits with different demodulation time constants an asymmetric response to the variations experienced is provided so that environmental factors which, without automatic adjustment, would result in an increase in sensitivity of the detection circuitry (for example a snow or rain covered floor) are controlled by the demodulator having longer demodulation time constant and hence slowly effect variations in the detection sensitivity threshold (a safety consideration where, for example, a person stands for a long period in the doorway). On the other hand, changes in the background conditions that would, in the absence of automatic adjustment, tend to decrease sensitivity of the detection circuitry (for example night fall, the sun passing behind a cloud, or evaporation of rainwater on the floor) are controlled by the demodulator having the shorter demodulation time constant (demodulator 79) and are therefore compensated for substantially instantaneously resulting in an increased detection sensitivity.

Figure 7:
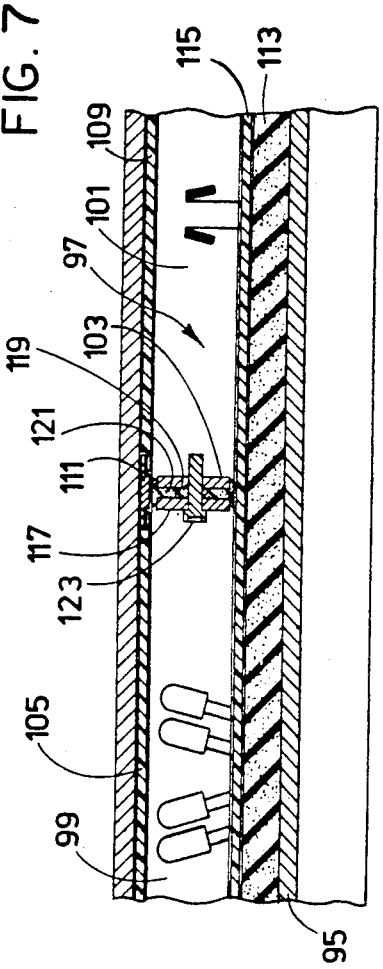
FIG. 7 is a sectional view taken through section line 7—7 of FIG. 1A.
Figure 6:
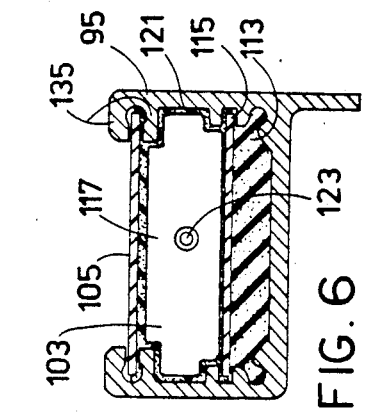
FIG. 6 is a sectional view of the apparatus housing taken through section line 6—6 of FIG. 1A.

Turning now to FIGS. 6 and 7, an improved housing of the apparatus of this invention is illustrated, the housing providing improved, and less expensive, means of manufacturing a housing which substantially electromagnetically isolates the emitter array from the receiver array (for the prevention of false triggers and the like). Housing 95 provides chamber 97 therein for housing of the circuitry. Chamber 97 is divided into separate compartments 99 and 101 by divider 103 configured for substantially selectively electromagnetically isolating chamber 99 from chamber 101. Filters, or lenses, 105 and 109 cover the opening to chamber 97 and are engaged with substantially opaque bridge 111, for isolating the two filters against movement of selected (usually infrared) electromagnetic radiation along the fibers of the filter between the two chambers.

Foam barrier 113 is provided at the bottom portion of housing 95 and below circuit board 115. Divider 103 includes wall portions 117 and 119 on each side of compressible foam barrier 121 which, when urged toward one another by adjustment screw 123, compresses from barrier 121 to thus fill gaps around wall portions 117 and 119, the part of the compressible portion 121 around the edges of the walls portions being pushed adjacent to bridge 111 the walls of housing 95 and circuit board 115 to provide substantial selected electromagnetic signal sealing between chambers 99 and 101.

Figure 8A:
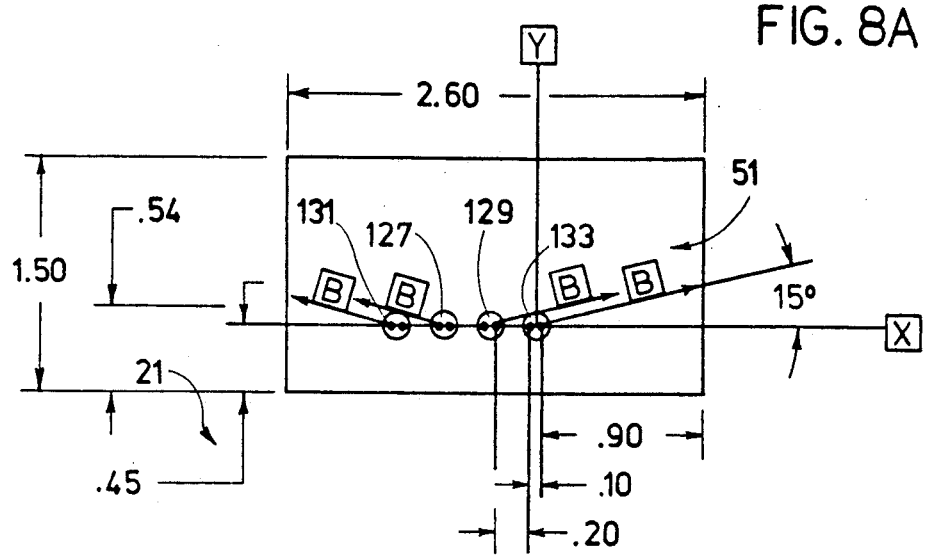
FIGS. 8A and 8B are diagrammatic illustrations of the positioning and orientation of the emitter ray of the apparatus of this invention.
Figure 8B:
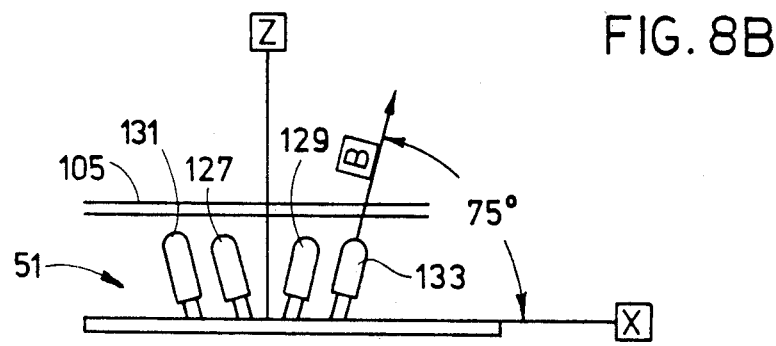
Figure 9A:
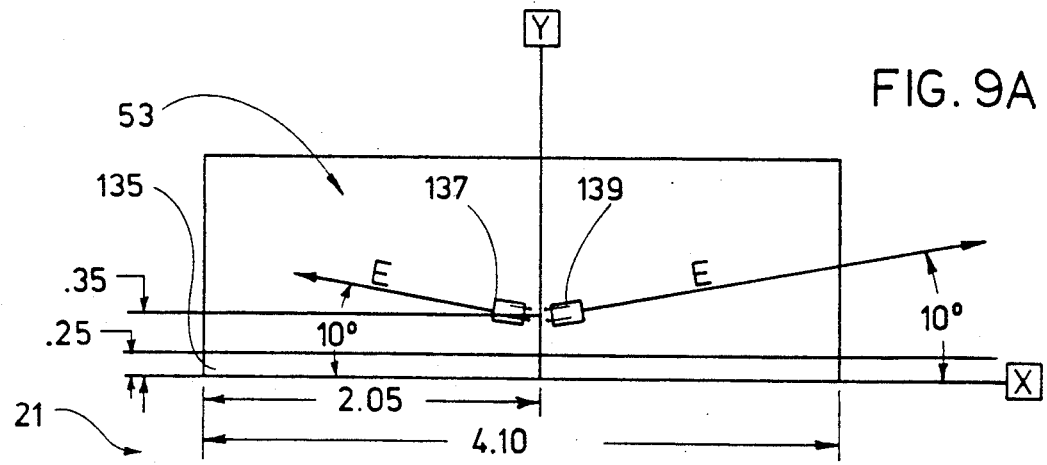
FIGS. 9A and 9B are diagrammatic illustrations of the positioning, orientation and shielding of the receiver array of the apparatus of this invention.

FIGS. 8A, 8B, 9A and 9B illustrate the configuration, orientation, and shielding of detector array 51 and receiver array 53 provided to optimize radiation intensity within the detection area and to match the emission pattern of the emitter array with the receiver array for more optimal detection. FIGS. 8A and 9A illustrate the arrays as if one were standing beneath the apparatus looking through filter, or lens, 105, the lines designated B and E representing the center line, or axis, of emission and detection of signals, respectively.

Emitters 127, 129, 131 and 133 are positioned linearly with the emitters being oriented so that the axis of emission for all emitters is up to approximately 15 degrees from the plan of motion of door 21. FIG. 8B illustrates orientation of emitters 127 through 133, the emission axis for each of the emitters being set at approximately 75 degrees from their mounting plane (x axis).

Figure 9B:
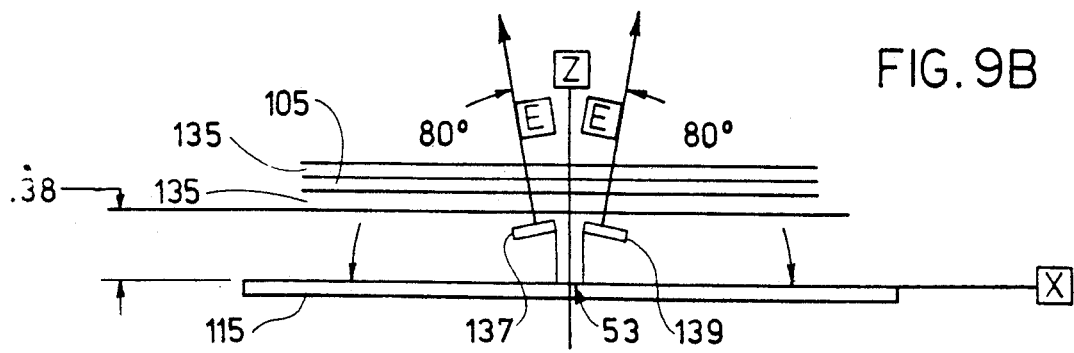

Line E in FIGS. 9A and 9B designate the axis of reception of receivers 137 and 139, the figures illustrating the desired orientation of the receivers relative to door 21. Shielding portion 135 of housing 95 (also shown in FIG. 6) and receivers 137 and 139 are relatively positioned so that incoming signals are partially blocked thereby further defining the effective, truncated detection zone, or footprint, illustrated in FIGS. 1A and 1B and the detecting area thus seen by the receivers.

As may be appreciated from the foregoing, an improved presence detecting apparatus and method are provided which is reliable, inexpensive to produce, and less susceptible to false triggers, malfunctions and the like.

What is claimed is:

1. A presence detecting apparatus for detecting the presence of a body in a detection area, said apparatus comprising:

emitter means for substantially synchronously emitting signals to the detection area;

receiver means for receiving at least some of said signals reflected form surfaces present in the detection area;

background compensation means connected with said receiver means for adjusting detection sensitivity of the apparatus to compensate for variations in background conditions in the detection area; and discriminating means connected with said receiver means and said background compensation means for discriminating when reflected signals received by said receiver means are indicative of a body in the detection area and for providing a detection output responsive thereto, said emitter means and said discriminating means being capable of substantially asynchronous operation.

2. The apparatus of claim 1 wherein said signals emitted by said emitter means are modulated electromagnetic signal and wherein said background compensation means includes first signal demodulation means and second signal demodulation means operably connected with said first signal demodulation means, said first and second signal demodulation means receiving an input indicative of said modulated signals received by said receiver means with said second demodulation means providing, within limitations established by said first demodulation means, an output indicative thereof.

3. The apparatus of claim 1 wherein said discriminating means includes first and second transient signal detecting means for detecting transient signals not indicative of a body in the detection area.

4. The apparatus of claim 3 wherein said first transient signal detecting means includes reference pulse generating means connected with said receiver means and said background compensation means for generating a transient signal discriminating pulse responsive to receipt of signal sat said receiver means and detection sensitivity established by said background compensation means, and comparator means connected with said receiver means, said background compensation means, and said reference pulse generating means for comparing said transient signal discriminating pulse to an input from said receiver means and providing a detection output pulse when said input from said receiver has a selected characteristic relative to said transient signal discriminating pulse, and wherein said second transient signal detecting means includes target detection means connected with said comparator means for providing an actuating output when a selected number of detection output pulses are received from said comparator means within a selected time period indicating a body in the detection area.

5. The apparatus of claim 1 wherein said apparatus further includes housing means including isolation means mountable therein between said emitter means and said receiver means for substantially selective electromagnetic sealing of said housing means between said emitter means and said receiver means.

6. The apparatus of claim 1 wherein the detection area is adjacent to a door, and wherein at least one of said emitter means and said receiver means includes shielding means adjacent thereto for partially shielding signals from the detection area so that the detection area is characterized by a truncated elliptical footprint, the truncated portion thereof being located adjacent to the threshold of the door.

7. A presence detecting apparatus having a variable detection sensitivity threshold for detecting the presence of a body in a detection area, said apparatus comprising:

emitter means for emitting signals to the detection area;

receiver means for receiving at least some of said signals reflected from surfaces present in the detection area and providing an output signal responsive thereto;

background compensation means for receiving said output signal from said receiver means and responsive thereto providing a detection sensitivity threshold signal which is automatically variable in response to variations in said output signal indicative of variations in environmental factors in the detection area, said detection sensitivity threshold signal being varied rapidly when an increase in the detection sensitivity threshold of said apparatus is desired and said detection sensitivity threshold signal being varied relatively more slowly when a decrease in the detection sensitivity threshold of said apparatus is desired; and discriminating means for receiving said output signal from said receiver means and said detection sensitivity threshold signal from said background compensation means and providing a detection output responsive thereto when said output signal has selected characteristics relative at least to said detection sensitivity threshold signal.

8. The apparatus of claim 7 wherein said background compensation means includes first and second signals demodulation means for controlling said variation of said detection sensitivity threshold.

9. The apparatus of claim 8 wherein said background compensation means includes response limiting means to limit variations of said detection sensitivity threshold signal in a range normally associated only with variations in environmental factors.

10. The apparatus of claim 7 wherein said discriminating means includes first and second transient signal detection means for detecting transient signals not indicative of a body in the detection area.

11. The apparatus of claim 7 wherein said background compensation means includes manually adjustable preset threshold adjusting means for establishing the maximum value of said detection sensitivity threshold signal and signal demodulation means for automatically varying said detection sensitivity threshold signal in response to variations in environmental factors in the detection area in a range below said maximum value.

12. In a presence detector having a receiver for receiving modulated signals from a detection area, a background compensation network for automatically compensating for variations in environmental conditions in the detection area so that a substantially constant detection sensitivity of the presence detector is maintained, said background compensation network comprising:

first signal demodulating means for receiving an input indicative of the modulated signals received by the receiver and providing an output indicative thereof;

second signal demodulating means operably connected with said first signal demodulating means, said second signal demodulation means also receiving said input and, within limitations established by said output from said first demodulation means, providing an output indicative thereof; and sensitivity threshold signal generating means connected with said second signal demodulating means for providing a variable output indicative of a desired sensitivity threshold, said threshold generating means including preset threshold level adjusting means for establishing a preset threshold level and summing means for summing said preset threshold level and said output from second signal demodulation means.

13. The background compensation network of claim 12 wherein said first signal demodulation means controls compensation for conditions in the detection area resulting in a decrease in the sensitivity of the presence detector, and wherein said second signal demodulation means controls compensation for variations in environmental conditions in the detection area resulting in an increase in the sensitivity of the presence detector.

14. The background compensation network of claim 12 further comprising an attack/decay controller connected with said first and second signal demodulation means and having an output therefrom provided to said second signal demodulation means.

15. The background compensation network of claim 12 wherein said outputs from said first and second demodulating means are DC signals proportional to the level of modulated signals received by the receiver of the presence detector.

16. The apparatus of claim 15 wherein said apparatus further comprises background adjustment limiting means for limiting variations of said DC signals from said first and second signal demodulation means to those representative only of variations in environmental conditions in the detection area.

17. A presence detecting apparatus for detecting the presence of a body in a detection area, said apparatus comprising:

emitter means for emitting signals to the detection area;

receiver means for receiving at least some of said signals reflected from surfaces present in the detection area and providing an output signal responsive thereto;

background compensation means for receiving said output signal from said receiver means and responsive thereto providing a detection sensitivity threshold signal which is variable in response to variations in environmental factors in the detection area; and discriminating means including modulating means for receiving said output signal from said receiver means and said detection sensitivity threshold signal from said background compensation means and providing a modulated signal responsive thereto, reference pulse generating means for consecutively generating first and second pulses, comparator means for comparing said pulses and said modulated signal and providing a detection output pulse when said modulated signal has selected characteristics relative to said pulses, and target detection means for providing an actuating output when a selected number of detection output pulses are received from said comparator means within a selected time period.

18. The apparatus of claim 17 wherein the detection area is adjacent to a doorway and wherein said receiver means includes shielding means for partially shielding signals reflected from the detection area.

19. The apparatus of claim 18 wherein said apparatus further comprises housing means for housing said emitter means, said receiver means, said background compensation means, and said discriminating means, said housing means including mounting means in part defining a chamber, filter means mountable at one part of said mounting means and having first and second portions, isolation means mountable between said emitter means and said receiver means in said mounting means for dividing said chamber into the first and second compartments and being configured to substantially seal said first compartment from said second compartment against movement therebetween of selected electromagnetic energy, and bridging means mountable at one part of said mounting means and made of material which is substantially opaque to selected electromagnetic signals, said bridging means engaging said first and second portions of said filtering means and said isolation means.

20. The apparatus of claim 17 wherein said background compensation means includes first and second signal demodulation means for receiving said output signal from said receiver means.

21. The apparatus of claim 17 wherein said background compensation means includes background adjustment limiting means for limiting variations in said detection sensitivity threshold signal to those normally related to changes only in environmental factors.

22. The apparatus of claim 17 wherein said presence detecting apparatus is used in association with an automatic door, and wherein said apparatus further comprises switching means connected with said target detection means of said discriminating means for receiving said actuating output therefrom and responsive thereto providing a door opening request to the automatic door.

23. A method of detecting the presence of a body in a detection area, said method comprising:
emitting signals to the detection area;
receiving at least some of said signals reflected from surfaces in the detection area;
generating a detection sensitivity threshold signal which is automatically variable in response to detected variations in environmental factors in the detection area;
generating an output signal indicative of said received reflected signals and said detection sensitivity threshold signal;
generating a reference signal comprising first and second consecutive pulses responsive to generation of said output signal; and
providing a detection signal when said output signal has selected characteristics relative to said pulses of said reference signal.

24. The method of claim 23 wherein the steps of emitting and receiving signals include the step of emitting and receiving signals so that said detection area is characterized by a truncated elliptical footprint.

25. The method of claim 23 wherein the step of generating a detection sensitivity threshold signal includes the steps of varying said detection sensitivity threshold signal rapidly in order to increase the detection sensitivity threshold, and, relative to an increase in the detection sensitivity threshold, more slowly varying said detection sensitivity energy, and bridging means mountable at one part of said mounting means and made of material which is substantially opaque to selected electromagnetic signals, said bridging means engaging said first and second portions of said filtering means and said isolation means.

26. The method of claim 23 further comprising the step of comparing said output signal to said pulses and providing said detection signal when said output signal is of a duration longer than the sum of the duration of said first pulse and at least a portion of the duration of said second pulse.

27. The method of claim 23 wherein said detection signal is a pulse, the method further comprising providing an actuating signal after a selected quantity of said pulses are provided in a selected period of time to thereby actuate a circuit receiving said actuating signal.

28. The method of claim 23 wherein the step of generating an output signal includes utilizing said output signal as a synchronization signal for generation of said reference signal.

29. The method of claim 23 further comprising the step of substantially isolating the point of emission of emitted signals from the point of reception of reflected signals so that the possibility of directly receiving said emitted signals is minimized.

30. The method of claim 23 further comprising the step of substantially limiting variations in said detection sensitivity threshold signal to variations corresponding to normally occurring environmental changes in the detection area only.

* * * * *

UNITED STATES PATENT AND TRADEMARK OFFICE
CERTIFICATE OF CORRECTION

PATENT NO. : 5,021,644

DATED : June 4, 1991

INVENTOR(S) : Beran et al.

It is certified that error appears in the above-identified patent and that said Letters Patent is hereby corrected as shown below:

Column 8, line 10, "form" should be --from--.

Column 8, line 26, "signal" should be --signals--.

Column 9, line 37, "signals" should be --signal--.

Column 12, Line 20 after "detection sensitivity" insert --threshold signal in order to decrease the detection sensitivity threshold.--

Signed and Sealed this

Twenty-seventh Day of October, 1992

Attest:

DOUGLAS B. COMER

*Attesting Officer*  *Acting Commissioner of Patents and Trademarks*